(12) United States Patent
Mallart et al.

(10) Patent No.: US 6,697,869 B1
(45) Date of Patent: *Feb. 24, 2004

(54) EMULATION OF STREAMING OVER THE INTERNET IN A BROADCAST APPLICATION

(75) Inventors: Raoul Mallart, Mountain View, CA (US); Atul Sinha, Palo Alto, CA (US)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,782

(22) Filed: Aug. 24, 1998

(51) Int. Cl.[7] .............................................. G06F 15/16
(52) U.S. Cl. ........................ 709/231; 709/205; 345/473
(58) Field of Search ................................ 709/231, 204, 709/232, 233, 205, 206; 345/473

(56) References Cited

U.S. PATENT DOCUMENTS

| | | | | |
|---|---|---|---|---|
| 5,526,479 A | * | 6/1996 | Barstow et al. | 345/473 |
| 5,668,948 A | * | 9/1997 | Belknap et al. | 709/231 |
| 5,671,347 A | * | 9/1997 | Barstow et al. | 345/473 |
| 5,701,582 A | * | 12/1997 | DeBey | 345/328 |
| 5,754,190 A | * | 5/1998 | Dutton et al. | 345/473 |
| 5,805,821 A | * | 9/1998 | Saxena et al. | 709/231 |
| 5,842,216 A | | 11/1998 | Anderson et al. | 707/203 |
| 5,864,678 A | * | 1/1999 | Riddle | 709/235 |
| 5,953,506 A | * | 9/1999 | Kalra et al. | 345/428 |
| 5,996,015 A | * | 11/1999 | Day et al. | 709/226 |
| 5,999,944 A | * | 12/1999 | Lipkin | 345/502 |
| 6,006,254 A | * | 12/1999 | Waters et al. | 709/205 |
| 6,055,563 A | * | 4/2000 | Endo et al. | 709/203 |
| 6,157,933 A | * | 12/2000 | Celi, Jr. et al. | 345/473 |
| 6,204,862 B1 | * | 3/2001 | Barstow et al. | 345/473 |
| 6,208,357 B1 | * | 3/2001 | Koga et al. | 345/473 |
| 6,307,561 B1 | * | 10/2001 | Doi et al. | 345/473 |
| 6,329,994 B1 | * | 12/2001 | Gever et al. | 345/473 |
| 6,331,861 B1 | * | 12/2001 | Gever et al. | 345/473 |
| 6,351,267 B1 | * | 2/2002 | Gever et al. | 345/473 |

FOREIGN PATENT DOCUMENTS

| | | | | |
|---|---|---|---|---|
| EP | 0909069 A2 | 4/1999 | | H04L/29/06 |
| JP | 9307590 | 11/1997 | | H04L/12/56 |

OTHER PUBLICATIONS

"Design of the Interactive Sharing Transfer Protocol", Richard C. Waters et al, Proc. of the Sixth IEEE Workshops on Enabling Technologies: Infrastructure for Collaborative Enterprises, 1998, pp. 140–147.

(List continued on next page.)

Primary Examiner—Ario Etienne
Assistant Examiner—Abdullahi E. Salad
(74) Attorney, Agent, or Firm—Michael J. Ure

(57) ABSTRACT

In a broadcast application on a client-server network the streaming is emulated of animation data over the Internet to a large number of clients. The animation is considered a sequence of states. State information is sent to the clients instead of the graphics data itself. The clients generate the animation data itself under control of the state information. The server and clients communicate using a shared object protocol. Thus, streaming is accomplished as well as a broadcast without running into severe network bandwidth problems.

12 Claims, 4 Drawing Sheets

OTHER PUBLICATIONS

"VirtuaLive Soccer" of Orad Hi–Tec Systems, Ltd., as found at <http://www.virtualive.com>.

"Key Concepts", Mar. 5, 1996, at: <http://sgi.felk.cvut.cz/~holecek/VRML/concepts.html>.

"Internetwork Infrastructure Requirements for Virtual Environments", D.P. Brutzman et al., Jan. 23, 1996, as found at: <http://www.stl.nps.navy.mil/~brutzman/vrml/vrml_95.html>.

"Overview of the MPEG–4 Standard", ISO/IEC JTC1/SC29/WG11 N2323 ed. Rob Koenen, Jul. 1998, at <http://drogo.cselt.stet.it/mpeg/standards/mpeg-4/mpeg-4.htm>.

"DIS–Protocol", at <http://www.cg.tuwien.ac.at/~faistt/LS-DMVE/dis.html>.

"Dead reckoning in DIS" at <http://www.ist.ucf.edu/lab-sproj/projects/dr.htm>.

"About ISTP" at <http://www.hri.com/opencom/isp.html>.

* cited by examiner

EMULATION OF STREAMING OVER THE INTERNET IN A BROADCAST APPLICATION

FIELD OF THE INVENTION

The invention relates to streaming multimedia files via a network. The invention relates in particular to enabling the emulation of streaming graphics or video animation over the Internet within a broadcast context.

BACKGROUND ART

The term "streaming" refers to transferring data from a server to a client so that it can be processed as a steady and continuous stream at the receiving end. Streaming technologies are becoming increasingly important with the growth of the Internet because most users do not have fast enough access to download large multimedia files comprising, e.g., graphics animation, audio, video, or a combination thereof, etc. Streaming, however, enables the client's browser or plug-in to start processing the data before the entire file has been received. For streaming to work, the client side receiving the file must be able to collect the data and send it as a steady stream to the application that is processing the data. This means that if the client receives the data faster than required, the excess data needs to be buffered. If the data does not arrive in time, on the other hand, the presentation of the data will not be smooth.

The term "file" is used herein to indicate an entity of related data items available to a data processing and capable of being processed as an entity. Within the context of the invention, the term "file" may refer to data generated in real-time as well as data retrieved from storage.

Among the technologies that are currently available or under development for the communication of graphics data via the Internet are VRML 97 and MPEG-4. VRML 97 stands for "Virtual Reality Modeling Language", and is an International Standard (ISO/IEC 14772) file format for describing interactive 3D multimedia content on the Internet. MPEG-4 is an ISO/IEC standard being developed by MPEG (Moving Picture Experts Group). In both standards, the graphical content is structured in a so-called scene graph. A scene graph is a family tree of coordinate systems and shapes, that collectively-describe a graphics world. The top-most item in the scene family tree is the world coordinate system. The world coordinate system acts as the parent for one or more child coordinate systems and shapes. Those child coordinate systems are, in turn, parents to further child coordinate systems and shapes, and so on.

VRML is a file format for describing objects. VRML defines a set of objects useful for doing 3D graphics, multi-media, and interactive object/world building. These objects are-called nodes, and contain elemental data which is stored in fields and events. Typically, the scene graph comprises structural nodes, leaf nodes, interpolation nodes and sensor nodes. The structural nodes define the spatial relationship of objects within a scene. The leaf nodes define the physical appearance of the objects. The interpolation nodes define animations. The sensor nodes define user interaction for particular user input modalities. VRML does not directly support streaming of data from a server into a client. Facilities such as synchronization between streams and time stamping that are essential in streaming do not exist in VRML. However, VRML has a mechanism that allows external programs to interact with VRML clients. This has been used in sports applications to load animation data into the client. See, for example, "VirtuaLive Soccer" of Orad Hi-Tec Systems, Ltd at <http://www.virtualive.com>. This web document discusses a process for producing realistic, animated, three-dimensional graphic clips that simulate actual soccer match highlights for being sent via the Internet. The system generates content that complements television sports coverage with multimedia-rich Web pages in near real time. In this example, the process works in two steps. First the graphics models of the stadium and of the soccer players are downloaded along with an external program, in this case a Java Applet. The user can then interact with the external program to request a particular animation. The data for this animation is then downloaded into the client and interacted with by the user. In terms of node type, this process first downloads the structural and leaf nodes, and thereupon the interpolation nodes. By changing the set of interpolation nodes, it is possible to run a different animation sequence. The process used in this example is somewhat equivalent to a single step process in which the user can choose the complete VRML file that contains all the models (structural nodes) and all the animation data (interpolator nodes). This approach leads to long download times before any content can be played on the client. This is experienced as a frustrating experience, especially if compared to TV broadcast where content is available instantly.

The other technology introduced above, MPEG-4, defines a binary description format for scenes (BIFS) that has a wide overlap with VRML 97. MPEG-4, on the other hand, has been designed to support streaming of graphics as well as for video. MPEG-4 defines two server/client protocols for updating and animating scenes: BIFS-Update and BIFS-Anim. Some of the advantages of MPEG-4 over VRML are the coding of the scene description and of the animation data as well as the built-in streaming capability. The user does not have to wait for the complete download of the animation data. For example, in the soccer match broadcast application mentioned earlier the animation an start as soon as the models of the players and the stadium are downloaded. MPEG-4 further has the advantage that it more efficient owing to its BIFS transport protocol that uses a compressed binary format.

Within the context of streaming, the known technologies mentioned above have several limitations with regard to bandwidth usage, packet-loss concealment or recovery and multi-user interactivity, especially in a broadcast to large numbers of clients.

As to bandwidth, the complete animation is generated at the server. This results in a large amount of data that needs to be transported over the network, e.g., the Internet, connecting the client to the observer. For example, in the soccer broadcast application mentioned above, the 22 soccer players need to be animated. Each animation data point per individual player comprises a position in 3D space and a set of say, 15 joint rotations to model the player's posture. This represents 63 floating-point values. If it is assumed that the animation update rate is 15 data points per seconds, a bit-rate of 665 Kbps is required. This bit-rate can be reduced through compression. Typically, using BIFS reduces the bit-rate by a factor of 20, giving a bit-rate of about 33 Kbps. However, this number has not taken into account overhead required for the Internet protocols (RTP, UDP and IP) and for additional data types, such as audio. However, typical modems currently commercially available on the consumer market have a capacity of 28.8 Kbps or 33.6 Kpbs. It is clear that streaming animation causes a problem at the end user due to bandwidth limitations. In the case of a broadcast to a large number of clients, say 100,000 clients, the data stream will need to be duplicated at several routers. A router on the Internet determines the next network point to which a packet should be forwarded on its way toward its final destination. The router decides which way to send each information packet based on its current understanding of the state of the networks it is connected to. A router is located at any juncture of networks or gateway, including each Internet point-of-presence. It is clear that the broadcast could lead to an unmanageable data explosion across the Internet. To prevent that from happening, the actual bandwidth needs to be limited to much lower than 28.8 Kbps.

As to packet loss concealment, VRML-based systems utilize reliable protocols (TCP). Packet losses are not an issue here. In the case of MPEG-4, BIFS uses RTP/UDP/IP. A packet loss recovery mechanism is therefore required. In a point-to-point application, re-transmission of lost packets can be considered. In a broadcast situation, however, this is much more complex. In both cases, however, MPEG reliability requires either higher bandwidth usage (redundancy) or higher latency (retransmission).

As to multi-user interactivity, both VRML and MPEG-4 are essentially based on a server-client communication. No provisions exist to enable communication among multiple clients.

For more information on VRML see, for example, "Key Concepts", Mar. 5, 1996, at: <http://sgi.felk.cvut.cz/~holecek/VRML/concepts.html>, or "Internetwork Infrastructure Requirements for Virtual Environments", D. P. Brutzman et al., Jan. 23, 1996, publicly available at: <http://www.stl.nps.navy.mil/~brutzman/vrml/vrml_95.html>

For more information on MPEG-4 see, for example, "Overview of the MPEG-4 Standard", ISO/IEC JTC1/SC29/WG11 N2323 ed. Rob Koenen, July 1998, publicly available at <http://drogo.cselt.stet.it/mpeg/standards/mpeg-4/mpeg-4.htm>.

OBJECT OF THE INVENTION

It is therefore an object of the invention to provide a technology that enables a client to process multimedia data as if it were a steady and continuous stream. It is another object to enable the continuous processing at a large number of clients in a broadcast over the Internet. It is noted that the problems identified above become rather acute in a broadcast application.

SUMMARY OF THE INVENTION

To this end, the invention provides a method of emulating streaming a multimedia file via a network to a receiving station connected to the network. Respective state information descriptive of respective states of the file is supplied. The receiving station is enabled to receive the respective state information via the network and is enabled to locally generate the multimedia file under control of the respective state information. In a broadcast for animation, the invention relates to a method of supplying data via a network for enabling displaying graphics animation. Respective state information is supplied over the network descriptive of successive respective states of the animation. The respective state information is received via the network. The receiving station is enabled to generate the animation under control of the respective state information upon receipt.

In the invention the multimedia fife (animation, video or audio file) is described as a succession of states. It is this state information that gets transmitted to the clients rather than the animation data itself. The term "emulating" therefore emphasizes that the information communicated to the client need not be streamed. The client generates the data for play-out locally and based on the state information received. Accordingly, the user perceives a continuous and steady stream of data during play-out as if the data were streamed over the network (under optimal conditions).

In a preferred embodiment, a shared-object protocol is used to accomplish the emulation. Both a server and a client have copies of a collection of objects. An object is a data structure that holds state information. Within the context of the virtual soccer match, an object is, for example, a graphics representation of one of the soccer players. The server receives a streamed video file and monitors the objects. It is noted that MPEG-4 enables the creation of video objects that are processed as an entity. If the server changes the state of this object, the shared object protocol causes the copy at the client to change accordingly. This is explained in more detail with reference to the drawings.

This state information is at a higher level of abstraction than the animation data itself. For example, in the soccer match broadcast application mentioned above, the state information comprises the current positions of the 22 players in the field and parameters specifying their current action (e.g., "running", "jumping", etc.). The use of higher level information has several advantages, in particular in a broadcast application where animation is streamed over the Internet to a large audience. The content of the state information as communicated over the Internet is very compact, thus requiring lower bandwidth than in case the animation data itself is streamed. The animation is generated locally from a few parameters. In addition, the update rate of animation data points is lower because the state of the animation changes at a slower rate than the animation data itself. This contributes to further lowering bandwidth requirements. Furthermore, the invention provides enhanced possibilities for packet loss recovery or concealment and for network latency jitter masking. It is easy to interpolate or extrapolate between states and to implement dead reckoning concepts. User interaction with the animation is more easily programmable because of this higher level of abstraction. Another advantage is that multi-user interaction is feasible if clients are enabled to share state information. Still another advantage is the fact that clients are enabled to convert the state information into animation based on their individual processing power that might differ from client to client. The resources available at the client may be different per client or groups of clients.

Within the context of the invention, reference is made to U.S. patent application Ser. No. 09/053,448 (PHA 23,383) of same Assignee, titled "Group-wise video conferencing uses 3D-graphics model of broadcast event" and incorporated herein by reference. This document addresses a TV broadcast service to multiple geographically distributed end users. The broadcast service is integrated with a conferencing mode. Upon a certain event in the broadcast, specific groups of end users are switched to a conference mode under software control so that the group is enabled to discuss the event. The conference mode is enhanced by a 3D graphics model of the video representation of the event that is downloaded to the groups. The end users are capable of interacting with the model to discuss alternatives to the event.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
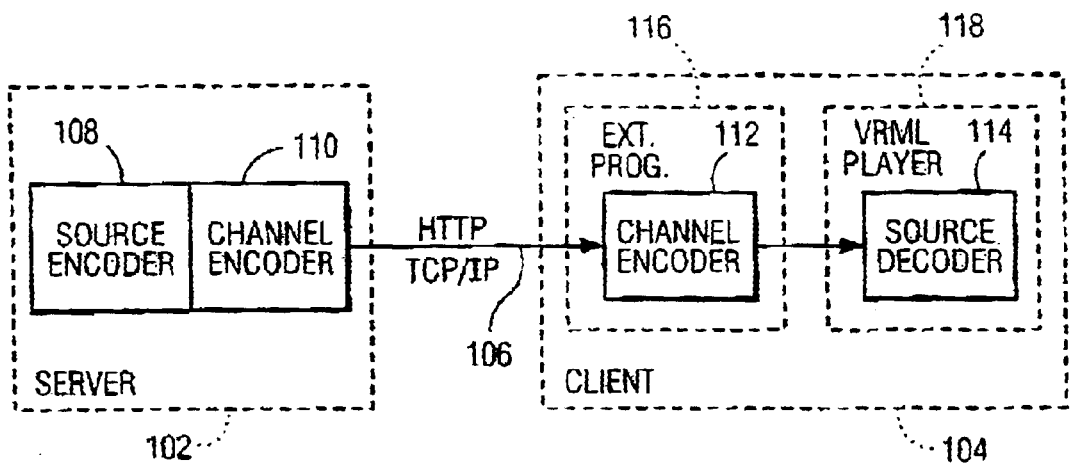
FIG. 1 is a diagram of a VRML client-server system.

FIG. 1 is a block diagram of a client-server system 100 based on VRML. System 100 comprises a server 102 coupled with a client 104 via a communication channel 106, here the Internet. System 100 may comprise more clients but these are not shown in order to not obscure the drawing. Server 102 comprises a source encoder 108 and a channel encoder 110. Client 104 comprises a channel decoder 112 and a source decoder 114. Source encoder 108 is considered a content generation tool. For example, it can be a tool that generates the VRML animation data from motion capture devices (not shown) operating on video. Channel encoder 110 is a sub-system that takes as input the VRML animation generated at source encoder 108 and transforms it into a form that can be transported over the Internet. The VRML animation data is stored in a file. The transport of this file uses a standard file transport protocol. At client 104, channel decoder is contained in an external program 116. It gets the animation data from the downloaded file and sends it to a VRML player 118 that performs the source decoder function. The source decoder function is essentially a management of the scene graph. This server-client communication procedure is not a streaming solution. The specification of VRML does not consider streaming a requirement. Facilities such as synchronization between streams and time stamping, both essential to streaming, do not exist in VRML.

Figure 2:
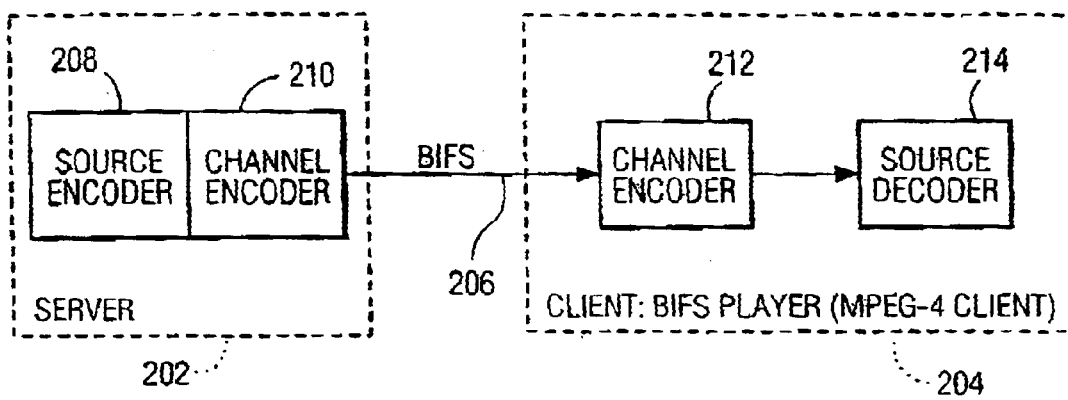
FIG. 2 is a diagram of an MPEG-4 client-server system.

FIG. 2 is a block diagram of a client-server system 200 based on MPEG-4. System 200 has a server 202 coupled to a client 204 via a communication channel 206. Server 202 has a source encoder 208 and a channel encoder 210. Client 204 has a channel decoder 212 and a source decoder 214. As mentioned above, MPEG-4 has been designed to support streaming. Among other things, MPEG-4 has defined a binary description format for scenes (BIFS) that has a wide overlap with VRML 97. Furthermore, MPEG-4 defines two server/client protocols for updating and animating scenes, namely BIFS-Update and BIFS-Anim. Advantages of MPEG-4 over VRML within the context of streaming is the coding of the scene description and of the animation data as well as the built-in streaming capability. Source encoder 208 is, similarly to encoder 108, a content generation tool. Channel encoder 210 is different from channel encoder 110. It generates a bit-stream in BIFS and BIFS-Anim formats. This bit-stream contains the graphics models of the players and the stadium (in the soccer match animation) as well as the animation data.

However, both systems 100 and 200 have several serious drawbacks when used in an environment for broadcasting animation to a large number of clients, say, 100–100,000 clients. The limitations relate to network bandwidth usage, packet loss concealment and multi-user interactivity as already mentioned above.

A preferred embodiment of the invention provides a solution to these problems by emulating the streaming utilizing a communication protocol that supports the sharing of objects by an object owner and an object viewer (or listener). A shared object is a data structure that holds state information. The set of shared objects that defines the entire state is called the world model. The clients and the server have their own copy of the world model. For example, an object within the context of a soccer match representation is the representation of a soccer player. The object's state information is then, for example, the position of the soccer player in 3D space or an action state such as "running" or "jumping" or "sliding" or "lying on the ground, apparently hurt, but has track record of comedian". Each shared object is owned by a particular party, e.g., the server. The owner can change the state information contained in the object. When this occurs, the protocol automatically synchronizes the state information across the network. Such a protocol is referred to herein below as a shared-object support protocol. The protocol ensures that all the world model copies remain consistent as the state of the world model evolves. Examples of protocols that can be used for this purpose are DIS (Distributed Interactive Simulation) and ISTP (Interactive Sharing Transfer Protocol). An underlying idea of the invention is to describe the animation as a succession of states. For example, in the soccer software application, the animation is described as a succession of player positions on the field and action states of the players. The state at a given moment is represented by the world model. As time passes, the state evolves and the protocol synchronizes the state of the world model across the network. This can also be explained in terms of shared objects. These objects hold the state information that describes the game at a given time instant. Updates of the state information for each object result in the generation of messages that are being sent across the network to the clients.

Figure 3:
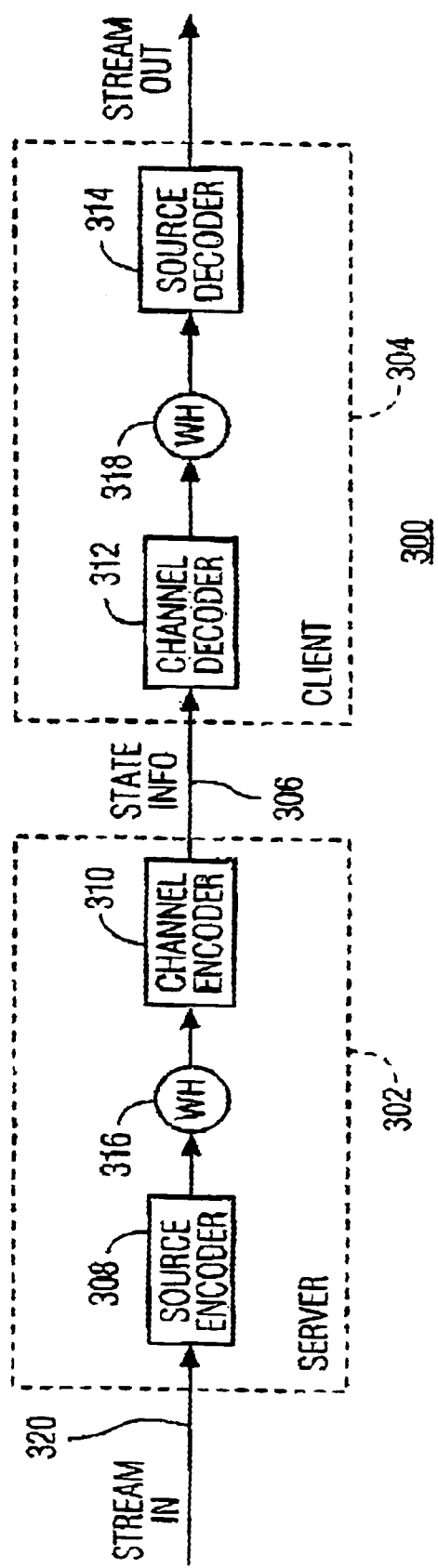
FIGS. 3–6 are diagrams of systems in the invention.

FIG. 3 is a block diagram of a system 300 in the invention. System 300 comprises a server 302 coupled to a client 304 via a network 306. Server 302 comprises a source encoder 308 and a channel encoder 310. Client 304 comprises a channel decoder 312 and a source decoder 314. Server 302 has a copy 316 of a world model and client 304 has a copy 318 of the world model. Data is streamed to source encoder 308 at an input 320. Source encoder 308 generates the required state information based on the input received and updates the state of the objects in world model copy 316 as the streaming process continues. This type of technology is used, for example, by the VirtuaLive Soccer system mentioned above. Channel encoder 310 monitors world model copy 316 and encodes the state changes of the shared objects. The encoded state changes are sent to client 304 via network 306. Channel decoder receives the state changes and updates local world model copy 318. Source decoder 314 performs two tasks. First, it generates the animation based on the state information received. Secondly, source decoder 314 manages the scene graph according to the animation. Source decoder 314 is now an intelligent component: it performs animation computation and, in addition, it is capable of performing other tasks such as state interpolation or extrapolation to conceal packet losses or network latency jitter.

Within this context reference is made to U.S. patent application Ser. No. 08/722,414 (PHA 23,155) of same Assignee, titled "Multi-player video game with local updates mitigates latency effects", herein incorporated by reference. This reference discusses a system wherein multiple users share a virtual environment through an interactive software application. State changes of a specific user are transmitted to one or more other users dependent on respective relative distances in the virtual environment between the specific user and each respective one of the other users. This conditional transmission reduces message traffic and allows the virtual environment to scale practically indefinitely.

Also, reference is made to U.S. patent application Ser. No. 08/722,413 (PHA 23,156) of same Assignee, titled "Latency effect in multi-player video game reduced by surrogate agent" and incorporated herein by reference. This document relates to a data processing system that processes an interactive software application for a competition between two or more users. The system comprises user-interface machines for actuation by respective ones of the users. The machines are interconnected via a network. In order to effectively eliminate latency, a user is represented at the other users' machines as an agent whose reaction to an action of the other user is governed by a rule base stored in the system.

Further reference is made to U.S. patent application Ser. No. 08/994,827 (PHA 23,319) of same Assignee and incorporated herein by reference, titled "Diversion agent uses cinematographic techniques to mask latency". This document relates to a software agent as a functional part of a user-interactive software application running on a data processing system. The agent creates a user-perceptible effect in order to mask latency present in delivery of data to the user. The agent creates the effect employing cinematographic techniques.

It is noted that copies 316 and 318 of the world model need not be identical, e.g., in appearance when rendered, as long as an object in one copy of the world model and another object in another copy of the world model are being treated as shared in the sense that they share state changes. The feasibility and extent of non-identity is application-dependent. For example, if one client's user likes to represent the soccer players as, say, penguins, and another client's user prefers the representation of say, ballet dancers, the representation at both clients are being kept consistent throughout the system by means of the shared state changes. As another example, client 304 may enable the user to input additional state information to control the rendering of the world model at play-out. For example, the user may select a particular point of view when watching the VirtuaLive soccer match. This state information is not, and need not be, present in server 302. It is noted that the rendering of the viewpoint based on state information and the world model is much less complicated and requires fewer resources than if the image were actually streamed into client 304 as a bitmap with depth information. Accordingly, in addition to the advantages of the invention mentioned earlier, the invention facilitates user-interactivity.

Figure 4:
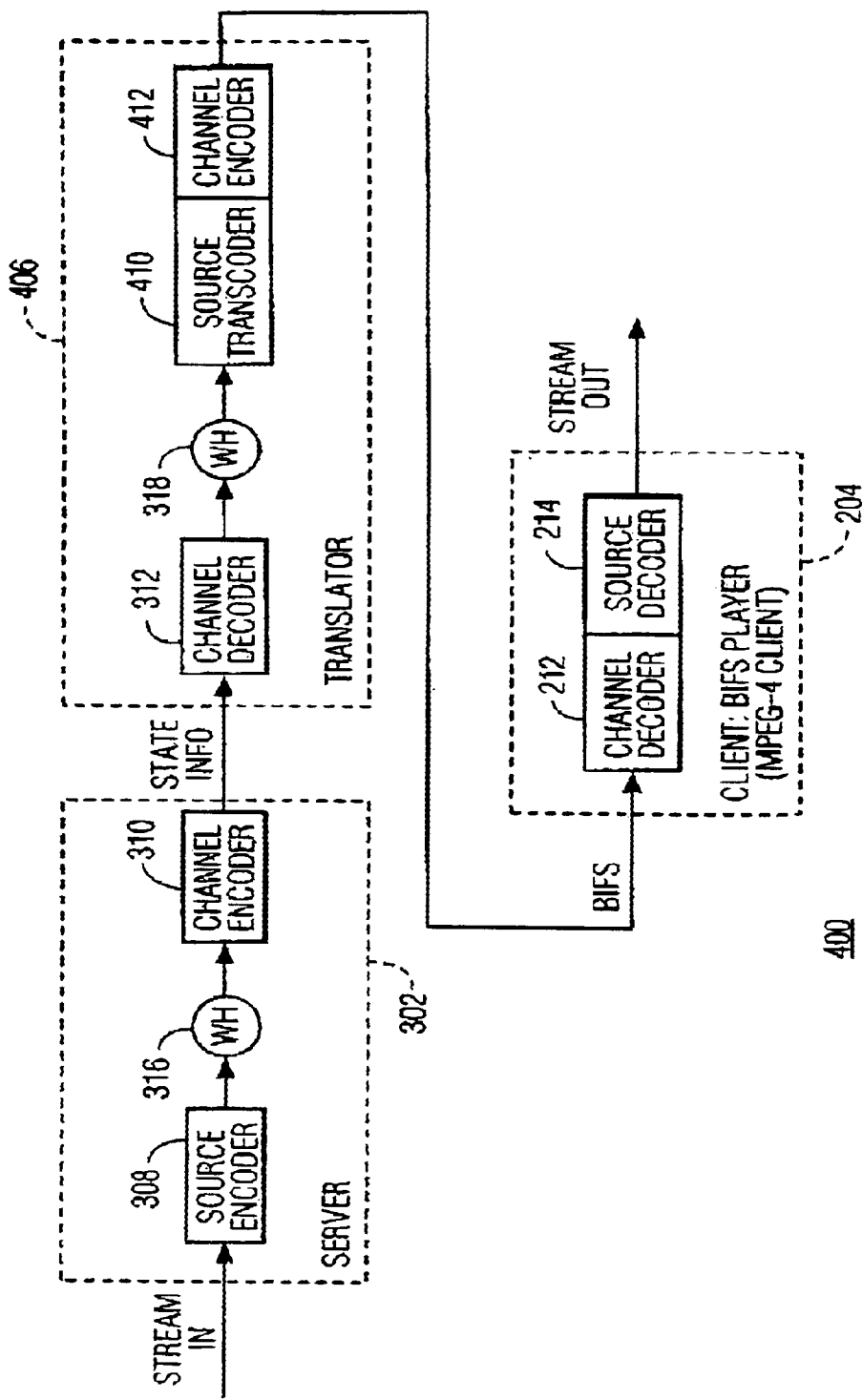

The configuration of system 300 assumes that client 304 is capable of running a software application and has a sufficiently powerful CPU and a sufficiently large storage. Some clients may not have these capabilities onboard. It is therefore desirable to consider lower-end terminals, also referred to as "thin clients". Such terminals could be, for example, low-profile MPEG-4 terminals that accept a BIFS stream as input but may not be powerful enough. This is explained with reference to FIG. 4 that is a block diagram of a system 400 according to the invention. System 400 comprises a server 302 that communicates with client 204 via a translator station 406. The configuration of server 302 and client 204 has been discussed above. Translator station 406 maintains a local copy of the world model. This world model is updated by the messages from server 302 so that the model represents the current state. Based on this state information, translator station 406 computes the animation. The animation data is encoded in BIFS-Anim format and transmitted to MPEG-4 client 204. Server 302 is similar to the one in system 300. Translator station 406 is a module that performs a conversion between messages transmitted under the shared-object support protocol on the one hand, and the BIFS-Anim bit-stream on the other hand. Station 406 has a channel decoder 312 discussed above, a source transcoder 410 and a channel encoder 412. Decoder 312 interprets the messages received from server 302 and updates local copy of the world model 318. Source transcoder 410 comprises a program that computes the animation based on state information. This module preferably performs such tasks as packet loss recovery (based on interpolation or extrapolation), dead reckoning, local animation, etc, similar to source decoder 314 above. Channel encoder 412 generates a bit-stream in BIFS and BIFS-Anim formats based on the output of source transcoder 410.

Figure 5:
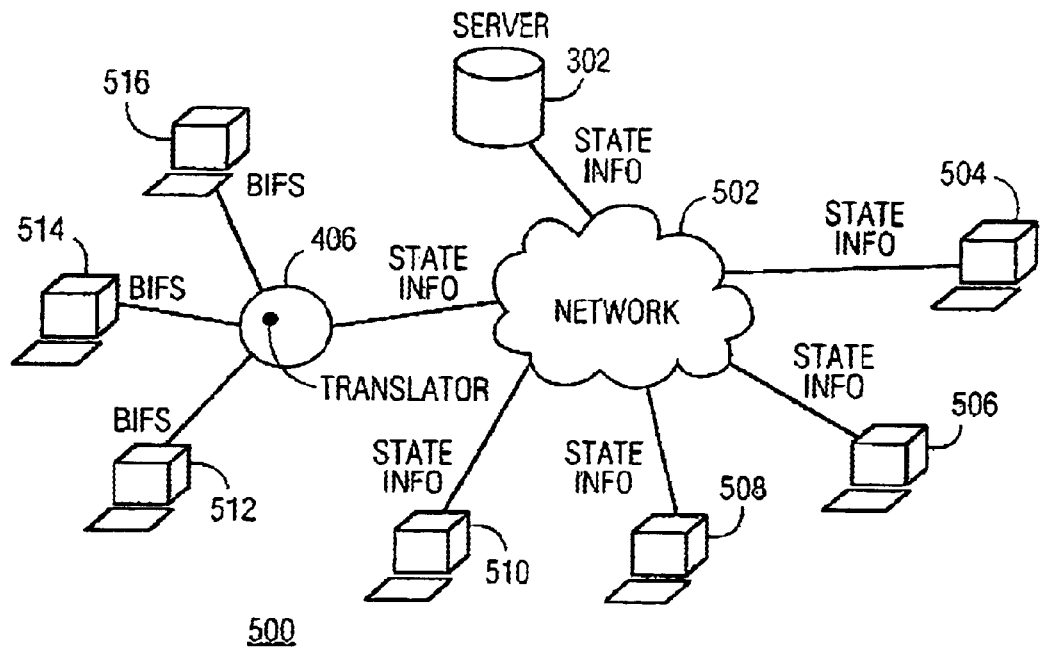

FIG. 5 is a block diagram of a system 500 in the invention. System 500 combines the configurations of systems 300 and 400. System 500 comprises a server 302, a network 502, clients 504, 506, 508 and 510 connected to server 302 via network 502. System 500 further comprises a translator station 406, and clients 512, 514 and 516. Clients 512–516 are coupled to server 302 via network 502 and translator station 406. Clients 512–516 are served by translator station 406 with BIFS bit streams, whereas clients 504–510 receive the state information in a protocol that supports shared objects and generate the animation themselves.

Figure 6:
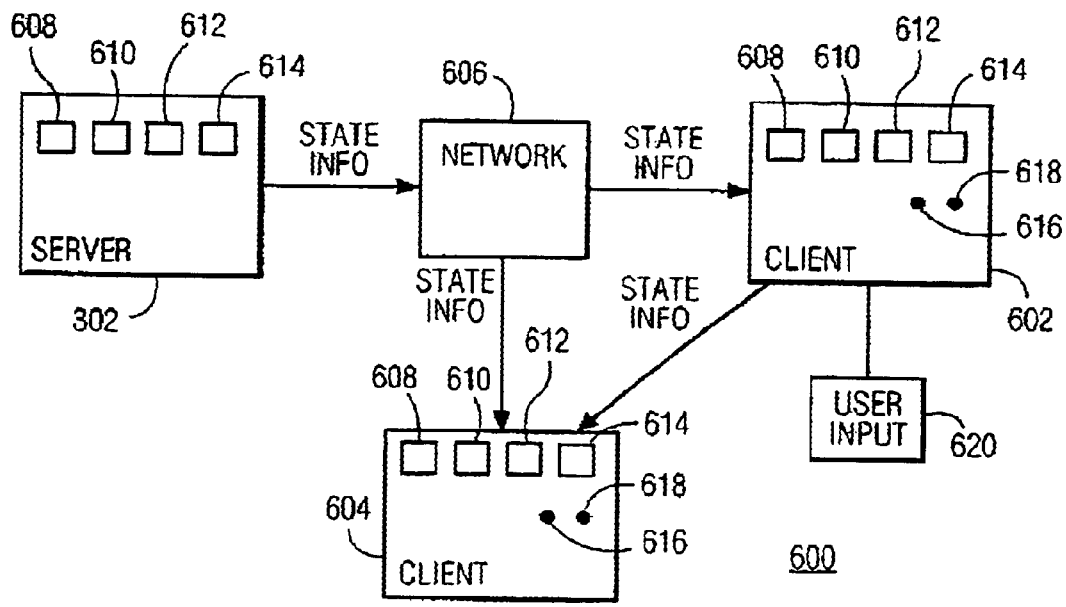

FIG. 6 is a block diagram of a system 600 in the invention that enables interaction among clients. System 600 comprises a server 302 coupled to clients 602 and 604 via network 606. The configuration of server 302 is discussed above. Server 302 has a copy of a world model with objects 608, 610, 612 and 614. Clients 602 and 604 have similar copies of the world model with similar objects 608–614. The copies of the world model are maintained consistent throughout system 600 through state information sent by server 302. This forms the basis for the emulation of streaming a graphics animation, a video animation or an audio file as discussed above. Clients 602 and 604 now also share objects 616 and 618 with each other, but not with server 302. For example, client 602 is owner of an object "viewpoint" that represents the view of the graphics representation of the soccer match chosen by client 602. Based on the state information received from server 302 client 602 renders a graphics image of the match as if it were viewed from a particular position in the stadium. The rendering of the image is based on the combination of current state information received from server 302, the local world model copy and the user input via user input means 620, e.g., a joystick or mouse, that enables selection of the viewpoint. Client 604 shares the viewpoint object that is being kept consistent with the one at client 602 under the control of the latter and using the shared-object support protocol. Objects 616–618 are not shared with other clients on the system. It is noted that the rendering of the viewpoint based on state information and the world model is much less complicated and requires fewer resources than if the image were actually streamed into clients 602 and 604 as a bitmap with depth information. System 600 may even be a totally distributed system without a server with main ownership. Each respective one of multiple clients owns respective ones of the objects in the world model that is perceptible from all clients. The owner of an object triggers a state change that gets propagated through the network so as to maintain consistency within the shared world model. In a multi-user application the effect is a continuous play-out at each client without severe bandwidth limitations as a consequence of the emulation of streaming of the animation.

We claim:

1. A method of emulating streaming a multimedia file via a network, comprising:

providing a first world model to a first station, and a second world model to a second station, the first station having at least a source encoder and a channel encoder coupled to the first world model, and the second station having at least a channel decoder and a source decoder coupled to the second world model;

streaming data to the source encoder of the first station;

generating state information based upon the data streamed to the source encoder;

updating at least one state of the first world model;

monitoring and encoding state changes in the first world model;

transmitting encoded state changes to the second station;

decoding, at the second station, the encoded state changes and updating the second world model; and generating animation based on the decoded state changes.

2. The method of claim 1, further comprising managing a scene graph at the second station according to the animation.

3. The method of claim 2, further comprising performing state interpolation.

4. The method of claim 2, further comprising performing state extrapolation.

5. The method of claim 2, further comprising rendering the second world model.

6. The method of claim 2, further comprising rendering the first world model and the second world model wherein the appearance of each of the renderings is not identical, and wherein corresponding shared objects in the first world model and the second world model share state changes.

7. The method of claim 6, further comprising locally providing state information to the second station, wherein the locally provided state information is not shared with the first station, and wherein play-out of the second world model is controlled, based at least in part, on the locally provided state information.

8. The method of claim 7, wherein the locally provided stat information comprises point of view.

9. A method of emulating streaming a multimedia file via a network, comprising:

providing a first world model to a first station, and a second world model to a second station, the first station having at least a source encoder and a channel encoder coupled to the first world model, and the second station having at least a channel decoder and a source transcoder coupled to the second world model, and a channel encoder coupled to the source transcoder;

streaming data to the source encoder of the first station;

generating state information based upon the data streamed to the source encoder;

updating at least one state of the first world model;

monitoring and encoding state changes in the first world model;

transmitting encoded state changes to the second station;

decoding, at the second station, the encoded state changes and updating the second world model;

generating animation data based on the decoded state changes; and encoding the animation data and transmitting the encoded animation data to a third station.

10. The method of claim 9, wherein the animation data is encoded into BIFS-Anim format and transmitted to an MPEG-4 client.

11. The method of claim 9, further comprising performing packet loss recovery.

12. The method of claim 11, wherein performing packet loss recovery consists of performing one or more of interpolation, extrapolation, dead reckoning, and local animation.

* * * * *